United States Patent [19]

Nunan

[11] Patent Number: 5,046,149
[45] Date of Patent: Sep. 3, 1991

[54] INFLATABLE RESTRAINT FIRING CIRCUIT DIAGNOSTICS

[75] Inventor: Douglas A. Nunan, Kokomo, Ind.

[73] Assignee: Delco Electronics Corporation, Kokomo, Ind.

[21] Appl. No.: 447,997

[22] Filed: Dec. 8, 1989

[51] Int. Cl.$^5$ ............................................. B60R 21/16
[52] U.S. Cl. ................................. 307/10.1; 280/735; 340/436
[58] Field of Search .................... 307/9.1, 10.1, 28; 340/436, 438; 280/734, 735

[56] References Cited

U.S. PATENT DOCUMENTS

| | | | |
|---|---|---|---|
| 4,438,424 | 3/1984 | Yasui | 340/436 |
| 4,938,504 | 7/1990 | Fukuda et al. | 280/735 |
| 4,968,965 | 11/1990 | Naitou et al. | 280/735 |

FOREIGN PATENT DOCUMENTS 0344788 12/1989 European Pat. Off. ............ 280/734

Primary Examiner—J. R. Scott
Assistant Examiner—Jeffrey A. Gaffin
Attorney, Agent, or Firm—Albert F. Duke

[57] ABSTRACT

The firing circuit for an inflatable restraint for a vehicle includes a storage capacitor which is charged from a 36 volt regulated power supply. The power supply is energized from the vehicle battery through the ignition switch. Both the battery and the capacitor are connected with the squib through impact sensor switches. A computer monitors the voltage at the squib to determine if an energy source is connected with the squib. The energization of the regulated power supply is delayed for a predetermined time interval following ignition switch activation to insure that the voltage initially monitored by the computer is applied to the monitoring junction from the battery and not from the capacitor.

5 Claims, 1 Drawing Sheet

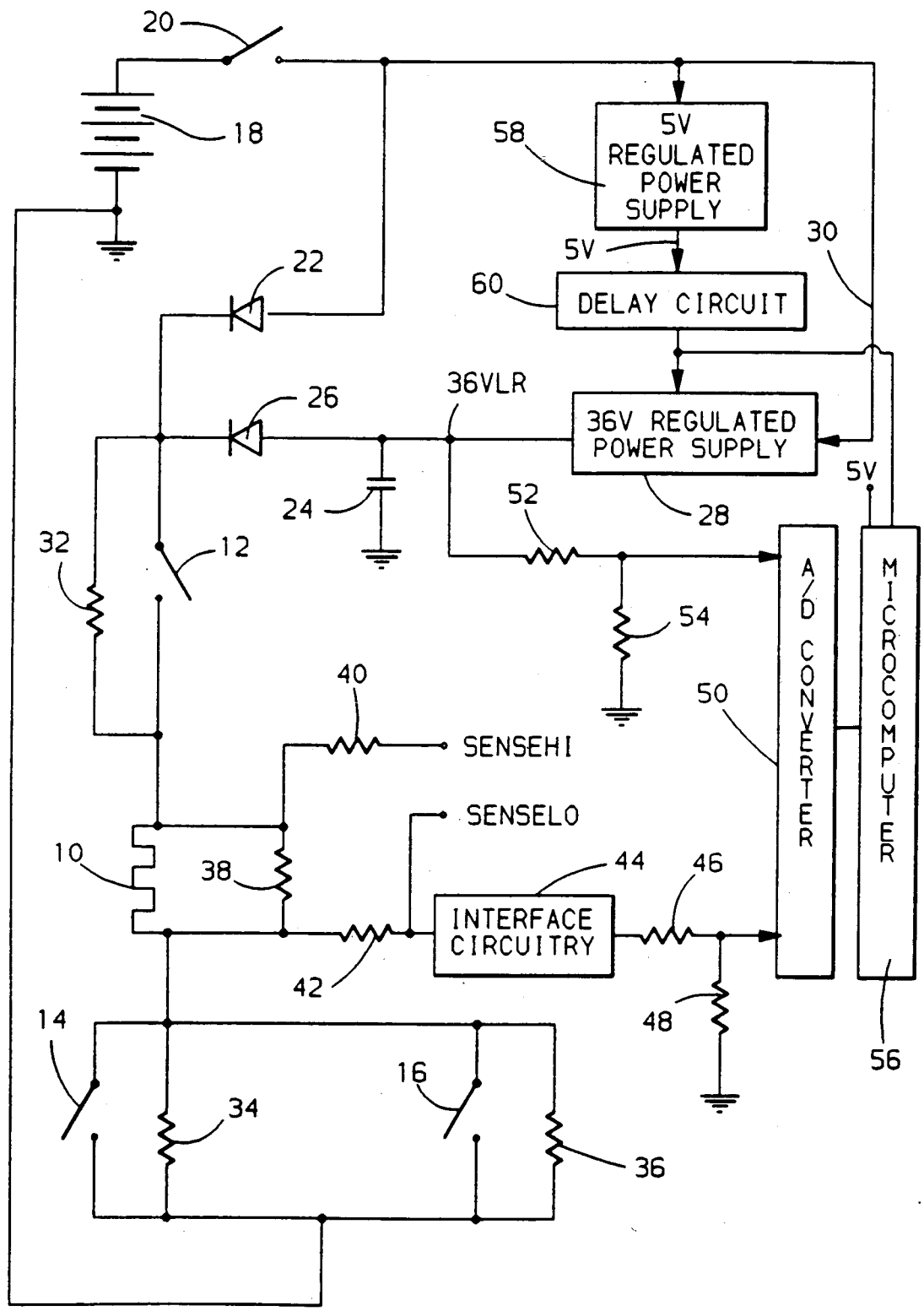

INFLATABLE RESTRAINT FIRING CIRCUIT DIAGNOSTICS

FIELD OF THE INVENTION

This invention relates to firing circuits for an inflatable restraint system for a vehicle and more particularly to a firing circuit which includes a storage capacitor which is charged by a regulated power supply to a voltage substantially larger than that of the battery.

BACKGROUND OF THE INVENTION

Passive vehicle occupant restraint systems generally provide a storage capacitor which is connected in parallel with the vehicle battery and provides a secondary source of energy for the firing circuit of the system. Since energy is proportional to the value of the capacitor and the square of the voltage, the size of the capacitors used in prior art systems has been relatively large to ensure a sufficient source of energy in the event of loss of battery during a collision. Such prior art system provide diagnostic circuitry which may include a computer for monitoring the voltage at the firing squib to determine the existence of various potential malfunctions such as open circuit or short to ground or a change in the resistance of the firing circuit.

SUMMARY OF THE INVENTION

With the foregoing in mind it is an object of the present invention to provide a firing circuit for a vehicle occupant restraint system which includes a first lower potential source and second higher potential source for supplying energy to the firing circuits, and diagnostic means for monitoring the voltage from the dual sources in order to indicate and record firing circuit malfunctions.

In accordance with the present invention a relatively small storage capacitor is charged from a 36 volt regulated power supply. The 36 volt supply as well as the ignition feed from the battery are diode OR'ed to the firing circuit. The low side of the squib in the firing circuit is monitored by a microcomputer to detect malfunctions such as an open circuit, short to ground, or change in resistance in the firing circuit. Since the 36 volt supply is at a higher potential, it will supply the voltage during steady state conditions. In order to check for malfunctions in the ignition power feed, a delay circuit is provided to control the enable signal to the 36 volt power supply. The delay circuit minimum time-out period encompasses the maximum time from power-on to the system until the microcomputer comes out of reset and initialization to check the ignition feed to the arming sensor in the firing circuit. This delay keeps the 36 volt supply from charging the capacitor voltage above the ignition range of 9-16 volts before the ignition input to the arming sensor can be tested.

BRIEF DESCRIPTION OF THE DRAWINGS

The above and other advantages of the invention will become more apparent from the following description taken in conjunction with the accompanying single FIGURE of the drawings which discloses a circuit diagram of the invention.

DETAILED DESCRIPTION

Referring now to the drawing, the firing circuit of the present invention includes a conventional squib 10 which is fired electrically to initiate the deployment process for the inflatable restraint or airbag. The high side of the squib 10 is connected to an arming sensor generally indicated by the normally open switch 12 and the low side of the squib 10 is connected to two parallel connected discriminating sensors generally indicated by the open circuit switches 14 and 16. The switch 12 is connected to the vehicle battery 18 though the usual ignition switch 20 and a diode 22 as well as to a storage capacitor 24 through a diode 26. The capacitor 24 is a relatively small capacitor in comparison with those used in prior art firing circuits and is on the order of 6800 microfarads. The capacitor 24 is charged from a conventional 36 volt regulated power supply 28 which is connected to the ignition switch through the conductor 30.

Resistors 32, 34 and 36 are connected in parallel with switches 12, 14 and 16 respectively while a resistor 38 is connected in parallel with the squib 10. These resistors permit a small current to flow in the squib firing circuit in order to monitor for malfunctions as is conventional. A resistor 40 is connected to the high side of the squib 10 while a resistor 42 is connected with the low side of the squib 10. Terminals designated SENSEHI and SENSELO provide inputs to crash detection circuitry not shown which responds to these inputs to record the existence of concurrent closure of the switch 12 and at least one of the switches 14 or 16.

Interface circuitry generally designated 44, which includes conventional filtering and protection circuitry, is interposed between SENSELO and voltage dividing means comprising resistors 46 and 48 which provide an input to A/D converter 50. The A/D converter also receives an input from a voltage divider comprising resistors 52 and 54 which provides a voltage indicative of the charge on the capacitor 24 and designated 36VLR. The A/D converter converts the analog input signals to digital words for input to and processing by a microcomputer generally designated 56. The microcomputer 56 is powered from a regulated 5 volt supply 58. The microcomputer 56 is programmed to set appropriate fault codes based on the inputs from SENSELO and 36VLR in the event of malfunction. L. Since the 36VLR point in the circuit is at a higher potential than the feed from the ignition switch 20, the voltage at 36VLR will be supplied to the arming sensor 12 during steady state conditions. In order to diagnose the input to the arming sensor 12 from the ignition switch, normally 9-16 volts, a delay circuit 60 prevents the enabling of the supply 28 for a predetermined time interval of for example 0.5 to 1.2 seconds. The time interval should be sufficient for the microcomputer 56 to come out of reset and initialization, upon power up, and to check the ignition feed to the circuits including dipoles 22, 26 and resistors 32,34,36,38. After expiration of the delay interval the supply 28 is enabled and the capacitor 24 is charged to 36 volts and will discharge though the squib 10 to inflate the airbag upon the occurrence of conditions causing closure of the switch 12 and at least one of the switches 14 or 36.

The delay circuit thus permits monitoring for open ignition feed to the arming sensor 12, and shorting of the diode 26 which would otherwise not be possible, because the capacitor would charge above the ignition feed voltage before the microcomputer could check the voltage at SENSELO and 36VLR.

The embodiments of the invention in which an exclusive property or privilege is claimed are defined as follows:

1. A circuit for energizing the firing means of an inflatable restraint system for a vehicle, comprising a vehicle storage battery, a storage capacitor, power supply means, an ignition switch operable from an off position to an on position to connect said battery to said power supply means, said power supply means connected to said capacitor and adapted when enabled for charging said capacitor to a voltage greater than the voltage of said battery, impact sensor switch means actuable from a normal state to a firing state in the event of vehicle impact, circuit means connecting said switch means in series with said firing means and in parallel with said battery and said capacitor, computer means for monitoring the voltage applied to said firing means, and time delay means for enabling said power supply means a predetermined interval of time after closure of said ignition switch.

2. The circuit of claim 1 wherein said predetermined period of time is greater than the time required for the computer to complete a monitoring routine to insure that the voltage initially monitored by said computer at said firing means results from said battery rather than said capacitor.

3. The circuit of claim 2 wherein the voltage monitored by said computer is the low side of said firing means.

4. The circuit of claim 3 wherein said capacitor is charged to 36 volts.

5. A circuit for energizing the firing means of an inflatable restraint system for a vehicle, comprising a vehicle storage battery, a storage capacitor, a regulated power supply, an ignition switch operable from an off position to an on position to connect said battery to said power supply, said power supply connected to said capacitor and adapted when enabled for charging said capacitor to a voltage greater than the voltage of said battery, arming sensor switch means connected with one side of said firing means, discriminating sensor switch means connected with the other side of said firing means, an OR circuit connecting said arming sensor switch means to said capacitor and through said ignition switch to said battery, computer means for monitoring the voltage at a junction between said firing means and said discriminating sensor switch means and for monitoring the voltage across said capacitor, and time delay means for delaying the application of voltage from said battery to said regulated power supply means for a predetermined interval of time after closure of said ignition switch.

* * * * *